United States Patent
Bharat et al.

(10) Patent No.: US 12,458,322 B2
(45) Date of Patent: Nov. 4, 2025

(54) ULTRASOUND GUIDANCE METHOD AND SYSTEM

(71) Applicant: KONINKLIJKE PHILIPS N.V., Eindhoven (NL)

(72) Inventors: Shyam Bharat, Arlington, MA (US); Alvin Chen, Cambridge, MA (US); Grzegorz Andrzej Toporek, Cambridge, MA (US); Balasundar Iyyavu Raju, North Andover, MA (US); Jonathan Thomas Sutton, Boston, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 182 days.

(21) Appl. No.: 17/795,752

(22) PCT Filed: Jan. 25, 2021

(86) PCT No.: PCT/EP2021/051540
§ 371 (c)(1),
(2) Date: Jul. 27, 2022

(87) PCT Pub. No.: WO2021/151804
PCT Pub. Date: Aug. 5, 2021

(65) Prior Publication Data
US 2023/0066948 A1    Mar. 2, 2023

Related U.S. Application Data

(60) Provisional application No. 62/967,796, filed on Jan. 30, 2020.

(30) Foreign Application Priority Data

Feb. 18, 2020    (EP) .................................... 20157878

(51) Int. Cl.
A61B 8/00    (2006.01)
A61B 8/08    (2006.01)
(Continued)

(52) U.S. Cl.
CPC .............. *A61B 8/42* (2013.01); *A61B 8/0883* (2013.01); *A61B 8/12* (2013.01); *A61B 8/461* (2013.01);
(Continued)

(58) Field of Classification Search
CPC ........... A61B 8/42; A61B 8/0883; A61B 8/12; A61B 8/461; A61B 8/5207; A61B 8/5223;
(Continued)

(56) References Cited

U.S. PATENT DOCUMENTS 9,895,135 B2    2/2018    Pelissier et al.
2013/0190600 A1    7/2013    Gupta et al.
(Continued)

FOREIGN PATENT DOCUMENTS

EP    3569154 A1    11/2019
WO    2005096226 A1    10/2005
(Continued)

OTHER PUBLICATIONS

International Search Report and Written Opinion for PCT/EP2021/051540; Mailing date: Mar. 25, 2021, 12 pages.

*Primary Examiner* — Peter Luong

(57) ABSTRACT

A method and system is for assisting a user in positioning an ultrasound probe relative to a subject's body. In use, the user moves the probe through a series of positions, and ultrasound image data is captured for each position, the data at each position corresponding to a particular imaging view of the anatomical region being imaged. An assessment procedure (16) is operable to process ultrasound data for different (Continued)

imaging views, and to determine for the data for each view a rating, representative of the suitability of the data for that view for observing one or more anatomical features or deriving one or more clinical parameters from the data. Guidance feedback is generated (18) for the user for assisting the user in positioning the probe, wherein the guidance feedback is based on a history (26) of image view quality over time over the course of the imaging procedure. For example, a trend in image view quality over time may be determined and output to a user, from which the user can quickly tell whether they are moving toward (in the case of increasing quality) or away from (decreasing quality) an optimum imaging position.

15 Claims, 4 Drawing Sheets

(51) Int. Cl.
  *A61B 8/12* (2006.01)
  *G06T 7/00* (2017.01)
(52) U.S. Cl.
  CPC .......... *A61B 8/5207* (2013.01); *A61B 8/5223* (2013.01); *A61B 8/56* (2013.01); *G06T 7/0016* (2013.01); *G06T 2207/10132* (2013.01); *G06T 2207/20081* (2013.01); *G06T 2207/20084* (2013.01); *G06T 2207/30048* (2013.01)
(58) Field of Classification Search
  CPC .......... A61B 8/56; A61B 8/54; G06T 7/0016; G06T 2207/10132; G06T 2207/20081; G06T 2207/20084; G06T 2207/30048
  See application file for complete search history.

(56) References Cited

U.S. PATENT DOCUMENTS

| | | |
|---|---|---|
| 2015/0310581 A1* | 10/2015 | Radulescu ............... A61B 8/42 348/77 |
| 2016/0100821 A1 | 4/2016 | Eggers et al. |
| 2017/0360403 A1 | 12/2017 | Rothberg et al. |
| 2019/0015076 A1 | 1/2019 | Rouet et al. |
| 2020/0069285 A1* | 3/2020 | Annangi ................ A61B 34/10 |
| 2021/0235023 A1* | 7/2021 | Imamura ............. H04N 23/632 |

FOREIGN PATENT DOCUMENTS

| | | | |
|---|---|---|---|
| WO | 2018002109 A1 | 1/2018 | |
| WO | 2018109114 A1 | 6/2018 | |
| WO | WO-2019175141 A1 * | 9/2019 | .......... A61B 8/0883 |
| WO | 2019201726 A1 | 10/2019 | |

* cited by examiner

ULTRASOUND GUIDANCE METHOD AND SYSTEM

CROSS-REFERENCE TO PRIOR APPLICATIONS

This application is the U.S. National Phase application under 35 U.S.C. § 371 of International Application No. PCT/EP2021/051540, filed on Jan. 25, 2021, which claims the benefit of U.S. Provisional Patent Application No. 62/967,796, filed on Jan. 30, 2020, and European Patent Application No. 20157878.8, filed on Feb. 18, 2020. These applications are hereby incorporated by reference herein.

FIELD OF THE INVENTION

The present invention related to a method and system for assisting a user in positioning an ultrasound probe of an ultrasound imaging system.

BACKGROUND OF THE INVENTION

Ultrasound imaging is widely used in the medical field for both observing anatomical regions of interest and for deriving measurements or estimates of certain key physiological parameters or anatomical features. For example the dimensions of imaged anatomical features can be determined, and this may be performed automatically in some cases, for instance using segmentation procedures. Also, physiological parameters can be derived in some cases, for example cardiac output, based on monitoring a relevant anatomical region (e.g. left ventricle) over a period of time. Again, this can be performed automatically in some cases, for instance using segmentation or other forms of image analysis.

One form of ultrasound imaging is transesophageal echocardiography (TEE).

The use of transesophageal echocardiography (TEE) to monitor cardiac function, for example during surgery, is gaining ground clinically. To view the left ventricle, the TEE probe is navigated to the mid-esophageal position. When the clinician desires to view the heart at any time during the surgery, he or she manipulates the probe as needed to ensure the correct view is captured by the probe transducers.

The use of TEE ultrasound for continual monitoring of the heart has been proposed but there have been few developments in this area. Continuous monitoring means a case in which a probe is kept in place over an extended period (for example throughout the duration of a surgical procedure) and ultrasound data captured throughout.

In this context, the TEE ultrasound might be used not only for qualitative observation of anatomical features of the heart, e.g. the dynamic motion of the heart in captured US images, but also for making quantitative measurements. Such measurements might include for instance left ventricular (LV) volume, stroke volume (SV), and cardiac output (CO). In some cases, model-based segmentation (MBS) might be applied to derive such measurements or parameters. Automatic segmentation might be performed for instance of one or more chambers of the heart. Other methods of deriving quantitative measurements might include a hybrid approach, such as performing full MBS upon a captured end-diastolic (ED) frame, followed by 2D or 3D tracking of the segmentation boundaries over the other frames of the cardiac cycle.

Long-term transesophageal echocardiography (TEE) monitoring (e.g. over hours) can be challenging because the probe position can drift over time. Furthermore, measurements may also be desired even at times when a specialist operator (e.g. a cardiologist, intensivist or other specialist) is absent (for example in an intensive care unit). This causes problems, since drift of the probe position interrupts accurate ultrasound observation and measurement acquisition, and potentially without a specialism operator present to correct the position.

Thus, means enabling non-expert operators to adequately position the probe would be of value.

SUMMARY OF THE INVENTION

The inventors of the present invention have previously proposed a new positioning assistance system which is able to provide real-time feedback as to whether an imaging view from the current probe position will result in an accurate measurement of a given one or more parameters.

However, often, a static image may not yield sufficient information since probe movements are coupled with cardiac motion. Therefore, a user might momentarily arrive at a best-possible probe position, but the static image-based method may not be able to identify that position as being optimum (e.g. due to lack of sufficient image features) before the user has once again moved the probe, and thus moved to a different view. Alternately, the user might be close to an optimal view, but may lack sufficient information to know in which way to finally adjust the probe to achieve the optimum view.

Similar problems arise also in relation to the positioning of other kinds of ultrasound probe, e.g. body ultrasound probes. Thus the problem is not confined only to transesophageal imaging, or to the imaging only of the heart.

Thus an improved approach to assisting a user in positioning an ultrasound probe for obtaining optimum data for observing one or more features or for deriving one or more parameters would be of value.

The invention is defined by the claims.

According to examples in accordance with an aspect of the invention, there is provided a method of guiding a user of an ultrasound imaging system during ultrasound imaging of a subject's body, wherein the ultrasound imaging system comprises an ultrasound probe having a moveable location relative to the subject, the method comprising:

receiving from the probe during an ultrasound imaging procedure ultrasound data representative of a series of ultrasound imaging views, each view corresponding to data captured from a respective location of the probe, and at a respective time point during the procedure;

applying an assessment procedure to the ultrasound data, the procedure operable to assess a quality of the ultrasound imaging views, the quality pertaining to the suitability of the ultrasound data for the different imaging views for observing one or more anatomical features or deriving one or more clinical parameters from the data;

based on the assessment procedure, generating guidance feedback for assisting a user in positioning the probe, wherein the guidance feedback is based on a history (26) of imaging view quality over time during the imaging procedure.

Thus embodiments of the invention are based on use of a temporal history of image views captured by a probe, and issuing feedback to a user based on this to assist them in deciding how the probe may be moved to achieve an optimal imaging view for observing a particular feature or deriving one or more clinical measurements. The feedback may just be a representation of the history of image view quality over time. From this, a user can observe whether their most recent path of moving the probe is increasing the quality or decreasing it. This alone provides useful feedback for guiding how to continue movement of the probe. For example, if quality is increasing, keep moving along the same path; if not, change path.

A quality rating may be explicitly calculated for each imaging view, indicative of the suitability of the data for deriving clinical parameters or observing anatomical features, or the data for multiple views can be assessed en bloc, and a trend in quality over the series of views assessed and output in a single operation. In either case, the method implicitly takes into account a quality rating of each imaging view and gives the user feedback based on a history of the changing quality for the views over time.

Unlike more complex probe positioning guidance approaches, the method does not require the actual physical position of the probe to be measured and tracked in preferred embodiments, but may be based solely on the image quality and the change in this quality over time as the probe has moved through different views. For example, a trend in the image quality may be used to determine whether image quality is increasing or decreasing over time, as the probe has been moved. A positive trend (increasing image quality) may be indication that the probe movements over the course of that trend period have been moving the probe closer toward an optimal imaging position, or at least that movement in that direction is improving image quality. Feedback might then be generated recommending maintaining the current movement trajectory. If the trend shows a decrease in image quality, the feedback might include a recommendation to stop or change the current movement trajectory. These represent examples only. Other examples will be discussed in detail below.

Thus, the approach proposed in embodiments of the present invention is much simpler both in terms of software and hardware than approaches that rely on physical tracking of a probe. It also enables highly intuitive feedback approaches. It effectively emulates the cognitive processes of a highly skilled user in trying to position the probe based on qualitative assessments of the changing quality of image views as they adjust the probe.

Furthermore, by providing the feedback based on the historical quality over a whole series of image views, this allows feedback to take into account temporal features (e.g. changes in features over time) as well as purely static spatial features. This offers an improvement over an approach which is based on assessing quality of each single static image, since for example a trend in quality over a recent period of time provides greater guidance as to how movement should be continued from then on in order to improve image quality.

The quality assessment referred to above may be for assessing the quality of the view for observing a particular anatomical feature or body or parameter, or for deriving or measuring one or more parameters.

The ultrasound data is preferably representative of temporally consecutive image views. The data may be a data series or data stream.

The method is preferably performed in real time during an imaging procedure (during a scan). It shall be understood by the skilled person in the context of the present application that term imaging is not restricted to procedures, data or system capable of providing images perceived by subjects or users. Imaging or scanning should be interpreted in a broader sense of any data acquisition (such as raw ultrasound data prior to its reconstruction) suitable to assess internal subject's anatomy. The real time nature of the method may be beneficial since it relaxes the constraint that the actual extraction of the one or more clinical parameters should be performed real-time. This is because the method guides the user to an optimum data acquisition location for deriving the clinical parameters, meaning that it is no longer necessary to compute the clinical parameters in real time for each and every location of the probe as it is moved. This may enable therefore in some examples the use of high-accuracy (but potentially slower-to-run) quantification algorithms such as model-based segmentation (MBS).

The method is a computer implemented method. It may be implemented by one or more processors or a computer for example.

As discussed above, the method may comprise determining for each of the imaging views a quality rating, the rating indicative of a suitability of the ultrasound data for the imaging view for observing one or more anatomical features or deriving one or more clinical parameters from the data.

As also mentioned above, the method may comprise determining a trend in the quality over time, and wherein the feedback is based on said trend. In other words, the feedback is generated based on a change in the image view ratings with progressing time. This may comprise determining a trend in calculated image quality ratings over time for example. Alternatively it may comprise determining a trend in the quality of the image views over time without explicitly calculating a quality rating for each individual image view.

The feedback may in some cases be indicative of said trend, e.g. simply a representation of said trend. Here the change in quality over time is explicitly displayed or otherwise communicated. From this the user can tell whether they are moving toward an optimal location or further from an optimal location.

For example the feedback may be a sensory output representative of the trend as a function of time.

As discussed above, a trend in the quality indicates a pattern of change in the quality, from which it can be more readily derived in what way the probe position should be further changed to improve quality.

In some examples, the method may comprise building up, based on the assessment procedure, a dataset representative of a history of the image view quality over time during the imaging procedure.

In this case, the method comprises a separate step of determining a history of image view quality (e.g. image view quality ratings). In alternative examples, the history may be taken into account implicitly, for example the method may comprise deriving, e.g. with a machine learning algorithm, a trend in image view quality over time.

In accordance with one or more embodiments, the feedback may be visual feedback indicative of the history of image view quality as a function of time.

For example the feedback may be in the form of a plot or graph of the image view quality as a function of time.

From this a user can quickly determine whether the quality is increasing or decreasing and thus whether they should continue along a current movement path or change the movement path.

According to one or more embodiments, the method may comprise determining a trend in the quality over time, and wherein the feedback is indicative of said trend.

Here the change in quality over time is explicitly displayed or otherwise communicated. From this the user can tell whether they are moving toward an optimal location or further from an optimal location.

In accordance with one or more embodiments, the feedback may include feedback indicative of a proposed movement of the probe location for capturing image data with an improved quality. The feedback is guidance for a movement for moving toward an optimal probe location for example. For example, the feedback may include indication of the direction and/or distance to move the probe.

This may be based on determining a trend in the quality over time. The feedback may be based on this trend. For example, if quality is improving, the feedback may be to continue the movement path that the user is following; if quality is decreasing, the feedback may be to change movement path.

Hence, in some cases the guidance feedback includes a recommendation to continue a current movement path of the probe or to discontinue a current movement path of the probe dependent upon whether the trend in quality rating is positive or negative.

In some further examples, the guidance feedback may be indicative of a proposed movement distance and/or speed. A proposed movement direction might also be provided but this might require provision of a positioning sensor for the probe to achieve.

There are different ways in which the assessment procedure might process the ultrasound image data to derive the image quality information.

In accordance with one set of embodiments, the assessment procedure may be applied imaging view by imaging view, i.e. data for one imaging view or frame or snippet is processed with the assessment procedure at a time.

Hence here, the assessment procedure may be applied in turn to ultrasound data for each respective imaging view, and a respective quality rating generated for each imaging view in turn.

The assessment procedure thus may be applied one at a time to the data for different imaging views, and the rating generated individually and in turn for each respective imaging view.

In accordance with an alternative set of embodiments, the assessment procedure may take as input the ultrasound data for a whole series of imaging views, and generate an assessment output in respect of that series of image views.

Hence here, the assessment procedure is applied to ultrasound data for a plurality of ultrasound imaging views at once. The plurality of imaging views may be temporally consecutive. In some examples, they may be temporally ordered, i.e. follow the order in which they were acquired during the scan, but may comprise only every $m^{th}$ imaging view of a previous series of N collected imaging views. For example, the assessment procedure may be applied to an input set of imaging views comprising every other imaging view from a previous set of N acquired imaging views.

The assessment procedure may involve explicitly determining a quality rating for each respective imaging view, or may take this into account implicitly and generate as an output quality information indicative of a trend or change in the quality over time across the series of images. For example, a machine learning algorithm might be used which has been initially trained with ultrasound image data corresponding to whole series of imaging views, and trained to determine a trend in quality. Here, the algorithm implicitly takes into account a quality of each image view, but does not explicitly calculate it. Alternatively, a non-machine learning algorithm might explicitly determine a quality rating for each imaging view.

In either case, by taking into account multiple temporally consecutive image views at once, rating determinations can take into account temporal context. For example, many anatomical features exhibit periodic motion (e.g. heart, lungs), and wherein suitability for deriving a clinical parameter is high during one phase of the period and low during another. Assessing a series of imaging views at once allows such periodic features to be taken into account, to avoid incorrectly designating a particular imaging view as low quality when in fact it is high quality, but periodically variable.

According to one or more examples, the method may comprise applying the ultrasound imaging procedure to a complete set of ultrasound data captured during the imaging procedure, the data representative of a complete set of imaging views encompassed by the imaging procedure. Here, on each run of the assessment procedure, the latest captured image view, plus all of the preceding image views (or at least for a defined prior time window) are processed. These may be assessed all at once or separately, depending upon which of the two approaches outlined above is used.

In some examples, the assessment procedure may be applied to the complete set of imaging data recurrently, upon capture of data for each new imaging view.

This way, the assessment is re-run each time a new view is imaged (e.g. each time the probe is moved to a new location). Thus a trend in the image quality can be continually updated.

In some examples, a history of image view quality (e.g. image quality ratings) over time is determined as part of the assessment procedure, and wherein the assessment procedure is configured to determine a trend in the image view quality as a function of time.

Here, analysis steps are all performed as part of one single integrated assessment procedure. For example this might be a machine learning or artificial intelligence procedure.

In accordance with one or more embodiments, the assessment procedure may utilize a machine learning procedure. This may comprise use of one or more machine learning algorithms.

In alternative examples, a non-machine learning algorithm may be used to perform the assessment procedure. For example a model-based segmentation procedure may be applied to identify anatomical features present in data for a captured view, and to determine a quality rating based on presence or absence of certain features for instance.

According to particular examples, the assessment procedure may comprise use of a convolutional neural network, CNN.

The CNN is trained with training data. The training data may comprise ultrasound data for different imaging views, the data labelled with a quality rating. The quality rating is generated by a trained human in advance and the data labelled accordingly. In other examples the training data may comprise sets ultrasound data respectively for different series' of imaging views, each labelled with a trend in the quality rating as a function of time. In other examples, the training data may be partially labelled, or even unlabeled, and labels or annotations are determined during the training process itself by means of an automatic method, such as segmentation or object detection for instance. For instance, if segmentation succeeds (i.e. an anatomical object of interest is identified within the image), quality of the image may be labelled as good. If not, image quality may be labelled as poor. In other examples, the training data may be partially labelled and unlabeled training instances may be incorporated into the training using active learning approach.

In one or more embodiments, the assessment procedure may comprise identifying or detecting presence of one or more anatomical features in the ultrasound data for the different image views, and wherein a quality (e.g. quality rating) of the image view is determined based on said detection.

For example, the quality determination may be based on presence or absence of one or more anatomical features.

In some examples, the determined quality (e.g. quality rating) may be indicative of, or related to, an extent to which an image view contains a particular anatomical feature. For example if only half of an anatomical feature of interest is present in the image, the quality rating may be 50%, while if none of the feature is present the quality rating is 0%. For example the quality may be related to the proportion of an anatomical feature or region of interest that is included in an image view.

In some examples, the quality rating may be related to presence and intensity of ultrasound image artefacts in combination with anatomical features. Image artefacts might be present due to poor acoustic coupling, anatomical abnormalities (calcifications, enlarged ventricles), or suboptimal imaging settings for example. Examples of image artefacts include speckle noise, reverberation, side lobe, or acoustic shadowing artefacts.

In some examples, the assessment procedure may comprise assessing movement of one or more anatomical features across a series of imaging views. For instance, where the procedure takes as input a whole series of imaging views, it may be configured to explicitly or implicitly track movement of the anatomical feature across the series of views and determine for instance a trend in image quality over time for the series of imaging views.

Examples in accordance with a further aspect of the invention provide a computer program product comprising code means configured, when run on a processor, to cause the processor to perform the method in accordance with any of the embodiments or examples outlined above or described herein, or in accordance with any claim of the present application.

Examples in accordance with a further aspect of the invention also provide a guidance system for guiding a user of an ultrasound imaging system during ultrasound imaging of a subject's body,
the ultrasound imaging system comprising an ultrasound probe having a moveable location relative to the subject, the guidance system being operatively coupleable with the ultrasound imaging system in use,
the guidance system comprising:
a receiving module adapted to receive from the probe during an ultrasound imaging procedure ultrasound data representative of a plurality of ultrasound imaging views, each view corresponding to data captured from a respective location of the probe, and at a respective time point during the procedure;
an assessment module configured to apply an assessment procedure to the ultrasound data, the procedure to assess a quality of the ultrasound imaging views, the quality related to the suitability of the ultrasound data for the different imaging views for observing one or more anatomical features or deriving one or more clinical parameters from the data; and
a feedback module configured to generate, based on the assessment procedure, guidance feedback for assisting a user in positioning the probe, the guidance feedback being based on a history of imaging view quality over time during the imaging procedure.

The modules may be separate processing components or may represent functions of a single integrated processing unit. Each module may comprise one or more processors, or the function of all of the modules may be performed by a single integrated processor or processing arrangement.

Embodiments of the invention also provide an ultrasound imaging system comprising:
an ultrasound imaging probe comprising one or more ultrasound transducers for capturing ultrasound data; and
a guidance system in accordance with any example or embodiment outlined above or described below, or in accordance with any claim of this application,
the ultrasound imaging probe being communicatively coupled with the receiving module of the guidance system for transferring captured ultrasound data.

In accordance with one or more embodiments the ultrasound imaging probe may be a transesophageal echocardiography (TEE) probe.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
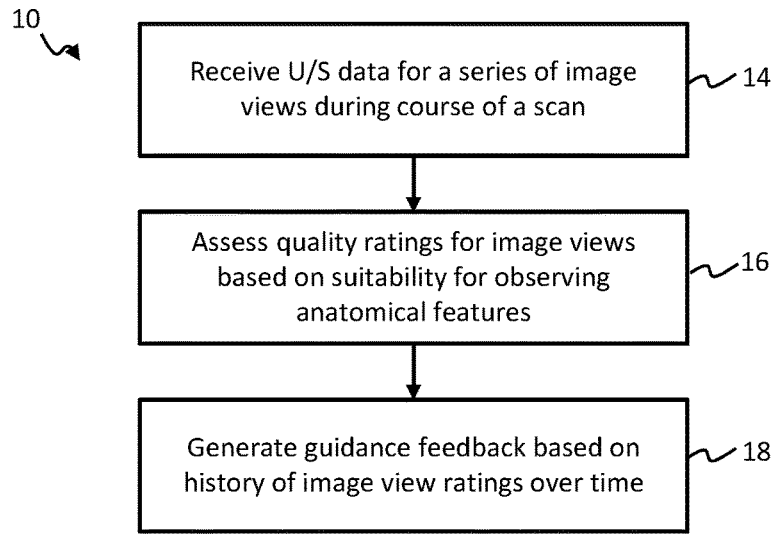
FIG. 1 outlines in block diagram form an example method in accordance with one or more embodiments.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method and system for assisting a user in positioning an ultrasound probe relative to a subject's body. In use, the user moves the probe through a series of positions, and ultrasound image data is captured for each position, the data at each position corresponding to a particular imaging view of the anatomical region being imaged. An assessment procedure is operable to process ultrasound data for different imaging views, and to determine for the data for each view a quality rating, representative of the suitability of the data for that view for observing one or more anatomical features or deriving one or more clinical parameters from the data. Guidance feedback is generated for the user for assisting the user in positioning the probe, wherein the guidance feedback is based on a history of image view ratings over time over the course of the imaging procedure. For example, a trend in image view ratings over time may be determined and output to a user, from which the user can quickly tell whether they are moving toward (in the case of increasing ratings) or away from (decreasing ratings) an optimum imaging position.

This embodiments of the present invention are based on the use of image features from recent temporal history of image data of the probe to provide insightful feedback to the user that can assist them in adjusting a positioning of the probe for achieving an optimum view of an anatomical body of interest, for instance to enable optimum acquisition of certain clinical parameters or measurements. This helps ensure the optimal probe location can be achieved faster by the operator, and not missed during their search.

One or more embodiments also propose a user interface that is operable to display guidance as to how a user should move a probe, based on the user's recent probe movements. This may for instance be an indication to continue an immediately preceding path of probe movement, or to change the path for instance.

One or more embodiments are described below that make use of an artificial intelligence (AI), e.g. machine learning, approach. However, other conventional algorithmic approaches may also be used in further examples.

An example guidance method in accordance with one or more embodiments is schematically outlined in block diagram form in FIG. 1.

The method 10 is a method of guiding a user of an ultrasound imaging system during ultrasound imaging of a subject's body. The ultrasound imaging system in this case comprises an ultrasound probe having a moveable location relative to the subject's body.

The method 10 comprises receiving 14 from the probe during an ultrasound imaging procedure ultrasound data representative of a series of ultrasound imaging views, each view corresponding to data captured from a respective location of the probe, and at a respective time point during the procedure.

The method 10 further comprises applying 16 an assessment procedure to the ultrasound data, the procedure operable to determine for each of the image views a quality rating indicative of the suitability of the ultrasound data for that image view for observing one or more anatomical features or deriving one or more clinical parameters from the data.

The method 10 further comprises generating 18, based on the assessment procedure, guidance feedback for assisting a user in positioning the probe, wherein the guidance feedback is based on a history of image view ratings over time during the imaging procedure.

The ultrasound data for each imaging view may correspond to image data for a single 2D or 3D image (i.e. an image frame). However, in alternative cases the imaging data might correspond to imaging data for a series of frames, e.g. a small video snippet captured for a particular position of the probe, i.e. for a particular imaging view.

The method is a computer implemented method. For example it may be run on one or more processors or computers. The one or more processors or computers may be arranged in use operatively coupled with an ultrasound probe or an ultrasound imaging system in accordance with one or more embodiments.

In one or more embodiments, the assessment procedure may comprise identifying or detecting presence of one or more anatomical features in the ultrasound data for the different image views, and wherein the quality rating is based on said detection.

For example, the quality rating may be based on presence or absence of one or more anatomical features.

In some examples, the quality rating may be indicative of, or related to, an extent to which an image view contains a particular anatomical feature. For example if only half of an anatomical feature of interest is present in the image, the quality rating may be 50%, while if none of the feature is present the quality rating is 0%. For example the rating may be related to the proportion of an anatomical feature or region of interest that is included in an image view.

In some examples, the assessment procedure may comprise assessing movement of one or more anatomical features across a series of imaging views. For instance, where the procedure takes as input a whole series of imaging views, it may be configured to explicitly or implicitly track movement of the anatomical feature across the series of views and determine for instance a trend in image quality rating over time for the series of imaging views.

Example clinical parameters that might be extracted or derived or measured from ultrasound image data might include the dimensions of one or more anatomical features, e.g. outer or inner dimension of sections of the heart, e.g. a left or right ventricle. The derived clinical parameters might include, by way of non-limiting example, left ventricular (LV) volume, stroke volume (SV), and cardiac output (CO). In some cases model-based segmentation (MBS) might be applied to derive such measurements or parameters. Automatic segmentation might be performed for instance of one or more chambers of the heart. Other methods of deriving quantitative measurements might include a hybrid approach, such as performing full MBS upon a captured end-diastolic (ED) frame, followed by 2D or 3D tracking of the segmentation boundaries over the other frames of the cardiac cycle.

The assessment procedure is configured to assess a suitability of a given achieved imaging view for extracting one or more clinical parameters or measurements using a given one or more extraction techniques, or a suitability for observing one or more anatomical features. The quality rating can be derived based on this. This assessment may be based on detection of one or more anatomical features in the imaging views (as discussed above), or may be based on another image analysis technique or procedure. The skilled person will readily appreciate various image processing and analysis techniques for achieving this assessment function.

In accordance with a preferred set of embodiments, the assessment procedure may employ use of one or more machine learning algorithms.

A machine-learning algorithm is any self-training algorithm that processes input data in order to produce or predict output data. Here, the input data may comprise ultrasound imaging data corresponding to different imaging views, and the output data may comprise a quality rating for the imaging data (as discussed above) or in some cases may comprise a trend in quality rating over time for a series of imaging views. These options will be explained in further detail to follow.

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries in this case correspond to example ultrasound data sets for different imaging views, or for a plurality of imaging views. The training output data entries correspond for example to quality ratings of the ultrasound data for observing one or more anatomical features or for determining one or more clinical parameters. They may in further examples correspond to temporal trends in quality ratings, in the case that the input data entries correspond to ultrasound data for series' of imaging views.

A machine learning algorithm represents just one example approach to implementing the assessment procedure. Other possibilities include for instance the use of non-machine learning algorithms, for example making use of algorithms programmed or encoded in one or more processors for determining quality ratings based on one or more image analysis procedures. Model-based segmentation algorithms may be employed in accordance with one or more examples. For example, a segmentation algorithm may be employed for identifying or detecting a particular anatomical feature of interest within each imaging view. A quality rating for each imaging view may be based on the outcome of the segmentation algorithm, for instance based on presence or absence of the anatomical feature of interest, or based on a degree to which the feature is fully included within the imaging view.

In another example, a detection algorithm might be applied, configured to identify and locate a particular anatomical feature such as mitral valve or a center of the septum and define a straight trajectory (directional vector) between center of the current field of view and said feature. The quality rating may be defined according to the length of the vector, for example in proportion to the length of the vector. The further away the feature from the center of the field-of-view, the lower the quality rating.

Figure 2:
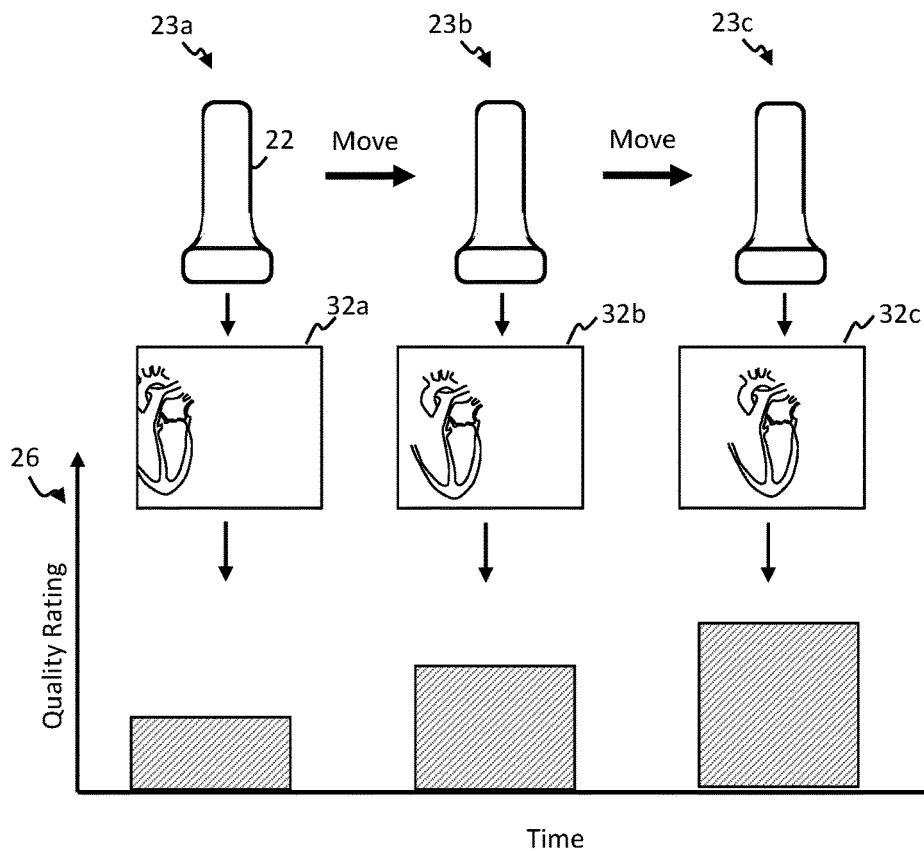
FIG. 2 schematically outlines the workflow of an example method in accordance with one or more embodiments.

To illustrate the concept of embodiments of the invention, an example workflow is schematically outlined in FIG. 2.

In use, an ultrasound imaging probe 22 is placed in a first position 23a with respect to the body of a subject and ultrasound image data acquisition is begun. For example, an ultrasound imaging system may be employed to which the ultrasound imaging probe 22 is coupled, and configured to control the ultrasound transducers of the probe to capture ultrasound data.

While in the first position, the ultrasound probe captures ultrasound data representative of a first imaging view 32a of a particular anatomical region. For illustration, the imaging views are shown as capturing views of the left ventricle of the heart.

The assessment procedure 16 is operable to process the ultrasound data for the first imaging view 32a and determine a quality rating or quality indicator. This is shown schematically in FIG. 2 by means of an example graph illustrating the quality ratings for the imaging views. The quality rating for the first imaging view 32a is shown beneath the frame for the first imaging view.

As discussed above, the quality rating is indicative of the suitability of the ultrasound data for that image view for observing one or more anatomical features or deriving one or more clinical parameters from the data.

The user, in the course of adjusting the probe position, moves the probe through a series of different locations 23a, 23b, 23c relative to the body. At each new location, 23b, 23c ultrasound data is captured representative of the imaging view 32b, 32c corresponding to that new location. The assessment procedure is operable to determine a quality rating for the ultrasound data for each new imaging view.

As a result, there may built up a history 26 of quality ratings for the data for different ultrasound imaging views. This is represented schematically in the form of a plot or graph in FIG. 2. In some examples, a quality rating is explicitly determined for each imaging view, and a dataset is built up which stores a history of the quality ratings for imaging views over the course of the imaging procedure. In other examples, quality ratings for a series of imaging views are taken into account implicitly as part of the assessment procedure, and the feedback generated based on the history.

In either case, feedback is generated for the user based on the history of quality ratings for imaging views over the course of the ultrasound scan. In some examples for instance a graph or plot of the history of quality ratings over time, such as the one depicted in FIG. 2 may be output as the feedback to the user. For example this plot may be displayed visually on a display device.

As discussed briefly above, there are two main approaches to assessing the captured image views for determining feedback for the user. One is based on assessing image views one at a time as the data for them is captured: imaging view by imaging view approach. The other is based on assessing whole sets of image views, preferably temporally consecutive image views, as a single block, and is based on assessing a trend or change in the quality rating of the imaging views over time within the assessed series.

For example, in the first set of embodiments, an artificial intelligence (machine learning) module may be employed, and may be trained to evaluate or assess incoming ultrasound data for different imaging views on a per-image-view basis. The output assessment might for instance take the form of a qualitative rating of the view, such as "good" (quantification of a given parameter is likely to be successful), "medium" (quantification of a given parameter may or may not be accurate) or "bad" (quantification of the given parameter is unlikely to be successful). In other examples, the module may be configured to generate a quantitative rating, where this may be a rating from a continuous scale or spectrum, or may be a rating from a discrete set of quantitative rating values, e.g. a scale of 1-5.

The quality rating result for each imaging view may be stored in a dataset (or a 'temporal vector'). This dataset may be cumulatively built up, one imaging view at a time, as ultrasound data for each new imaging view is received. In examples, feedback may be provided in the form of a sensory (e.g. visual) representation to the user of at least a temporal portion of this dataset. For example, the past n quality rating results may be displayed to the user in an intelligible manner. The user can then ascertain based on this feedback whether they are proceeding in the right direction (i.e. if ratings are increasing, they are moving in the right direction and vice versa). The number n of previous rating results that are output to the user may be pre-defined, or may be user adjustable in other examples. In this way, results are displayed only for the most immediately recent imaging views captured by the probe (for the most immediately recent time window). This makes the results more useful for guiding ongoing or future movement of the probe, as the trend observable in the results related to the most recent movement path. Thus if the user is changing the movement path fairly frequently, the displayed results are able to react to this, and present the user with quality results for their most recent movement path of the probe.

By way of example, in the second set of embodiments, the assessment procedure (e.g. a machine learning module) may be fed as input the ultrasound data for the set of n most recent ultrasound imaging views. The assessment procedure may generate based on this an output indicative of whether the user-imparted probe movements are bringing it closer to an optimal position, based for instance on the history of change in image features, or further away. Thus trend data may be output. The feedback may in some examples be in the form of simple suggestions or recommendations (e.g. text or audio) to the user based on the trend in the quality results.

These two approaches will now be described in more detail, starting with the first approach.

In accordance with a first set of embodiments, the assessment procedure is applied separately to ultrasound data for each imaging view, i.e. it is applied serially or sequentially to the data for each respective imaging view in turn. A respective quality rating is generated for each imaging view in turn.

Figure 3:
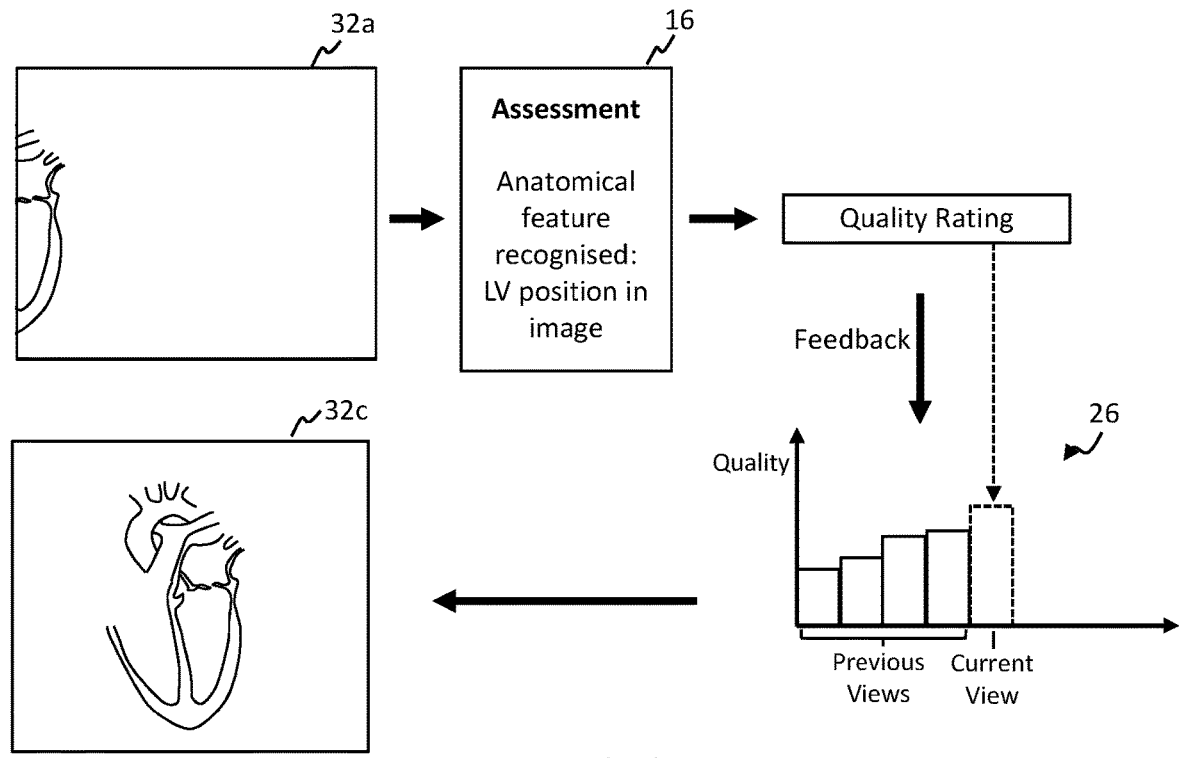
FIG. 3 further schematically illustrates the workflow of an example method in accordance with one group of embodiments.

An example workflow in accordance with this set of embodiments is schematically outlined in FIG. 3.

With the probe in a given (current) location relative to the subject's body, ultrasound data is captured by the probe 22 corresponding to that location, the ultrasound data representative of a particular ultrasound imaging view 32a from that location. The ultrasound data from the current captured view 32a is fed in real time to the assessment procedure 16 (e.g. an assessment module), which processes the data for that imaging view and derives a quality rating indicative of the suitability of the ultrasound data for that imaging view 32a for observing one or more anatomical features or deriving one or more clinical parameters from the data. For example, in the example shown in FIG. 3, the anatomical feature of interest is the left ventricle (LV). The assessment procedure derives a quality rating based on detection of the LV within the image. For example, the assessment procedure determines the extent to which the LV is present in the ultrasound data for the imaging view 32a. The assessment procedure may employ a segmentation algorithm to do this, configured for detecting at least the LV in ultrasound data. Alternatively, a machine learning algorithm may be employed, trained to recognize at least the LV in ultrasound data, and to classify imaging views according to whether the LV is present or an extent to which it is present.

By way of example, in the example of FIG. 3, the current imaging view 32a has the left ventricle (LV) only partially visible, with part of the LV occluded.

A quality rating is output by the assessment procedure 16 for the current imaging view. This is then appended to a dataset which stores a cumulative history 26 of image view quality ratings over time during the imaging procedure. This is illustrated in FIG. 3 in the form of a graph which displays the ratings (y-axis) as a function of time (x-axis). However, the dataset may take the form of any data structure for storing the results.

Guidance feedback is generated for (e.g. sensory) output to the user based on the history 26 of quality rating results over time. In the example of FIG. 3, the feedback takes the form of a sensory representation of the history of quality rating results over time. For example, the feedback takes the form of a visually displayed plot or graph of the history 26 of quality rating results. In some examples, the results for then most recent imaging frames may be output for the feedback, as discussed above.

Based on the feedback, the user is able to ascertain whether their current movement path for the probe is improving quality results (and so taking them closer to an optimum imaging position), or is deteriorating results (and so taking them further from an optimum position). Based on this, the user can adjust or adapt the movement of the probe to try to improve the quality results, and move toward an optimum position.

In other words, the feedback presents the user with information indicative of a trend in the imaging view quality results over time (for example a trend for the n most recent results) from which the user can ascertain how they should continue or change the probe movement path from thereon.

For example, if the view quality is trending upwards, the user gets positive reinforcement of their actions, and may continue the same maneuver until they arrive at a good view. Alternately, if the view quality is trending down, then the user may change the probe maneuver until it starts to trend upwards.

At each new position, ultrasound data for that new imaging view is captured and fed to the assessment procedure 16 for determination of a quality rating of the imaging view. The steps of the method then continue cyclically until the user reaches an optimum imaging view 32c position, where the anatomical feature is optimally viewable or the clinical parameter is optimally derivable based on the imaging position.

The assessment procedure in this example preferably employs one or more machine learning algorithms. For example, the assessment procedure in this example preferably employs use of a convolutional neural network (CNN).

The CNN may for example be trained with a training task of predicting the quality rating of ultrasound data for each of a set of input imaging views (for example, the data for each imaging view corresponding to a single 2D or 3D ultrasound image frame).

For instance, the CNN may in some examples take the form of a network for multi-class classification. This might enable for instance classification into one of a set of discrete quality ratings (e.g. "bad", "medium" and "good"). This may be trained by minimizing the cross-entropy loss.

Another approach might be a binary classification network, such as a CNN. This network may be trained for example to classify images into two categories (e.g. "bad"-0, "good"—1) using cross-entropy loss. Predicted likelihood (between 0 and 1) may be output as a continuous quality score.

Another approach might be to train a network which is configured to regress the quality score. This might enable classification according to one of a spectrum of quality ratings, which might be a continuous or discrete spectrum (e.g. numbers between 1 and 5). The network might be trained for instance by minimizing the root mean square (RMS) error loss.

The architecture of the network in either case may consist of single convolutional layer, or a plurality of convolutional layers, followed by both spatial pooling (global, max-pooling), and one or more fully connected layers with softmax (multiclass classification), sigmoid (binary classification), or linear (regression) activation function in the final layer.

Each convolution layer may comprise convolutional operation, non-linear activation, batch normalization, drop-out, and spatial pooling. Implementation of each of these operations will be well known and understood by the skilled person, and examples are known in the art (e.g. ResNet, DenseNet, AlexNet).

The paper Ian Goodfellow, Yoshua Bengio, and Aaron Courville. 2016. Deep Learning. The MIT Press, for example provides details of a suitable convolutional neural network which may be implemented in accordance with embodiments of the present invention.

The network is preferably trained on a relatively large clinical data set comprising 2D or 3D echocardiography images with even distribution among classes (i.e. with evenly distributed quality scores). The data set for example may include a large variety of different cases, patient sizes and typical heart anomalies.

Each 2D or 3D ultrasound image is labelled in advance by expert sonographers with the correct quality rating (e.g. "bad", "medium", "good", or quality scores (1-5)), the quality rating indicative of a confidence that the ultrasound data will be suitable for observing one or more anatomical features of interest or deriving or quantifying one or more clinical parameters from the data. Some examples of clinical parameters which might be derived from the ultrasound data include for example: the volume of one or more of the heart chambers, or flow rates through one or more blood vessels.

2D or 3D ultrasound images may be labelled by means of an automatic algorithm, such as a model-based segmentation algorithm. For instance, if certain anatomical features represented by a segmentation mask are present, the image might be labelled as "good", or reliable. If the segmentation mask is only partially present (60%), image might be labelled as "medium", or marginally quantifiable. The labeling scheme described here is application specific, and depends on the type of quantification performed. Also, the quality rating may be a continuous rating rather than discrete, qualitative descriptors as discussed in this example.

In accordance with a second set of embodiments, instead of assessing each imaging view one at a time, the assessment procedure may be applied to ultrasound data for a plurality of ultrasound imaging views at once, the plurality of imaging views preferably being temporally consecutive. For example, the assessment procedure receives as input ultrasound data for a temporally consecutive series of imaging views, for example the n most recent imaging views. It may in some examples generate as output an indication of a trend or change in image quality rating over time over the course of the series of images or at least over a part of the series of images, e.g. a most recent time window.

Figure 4:
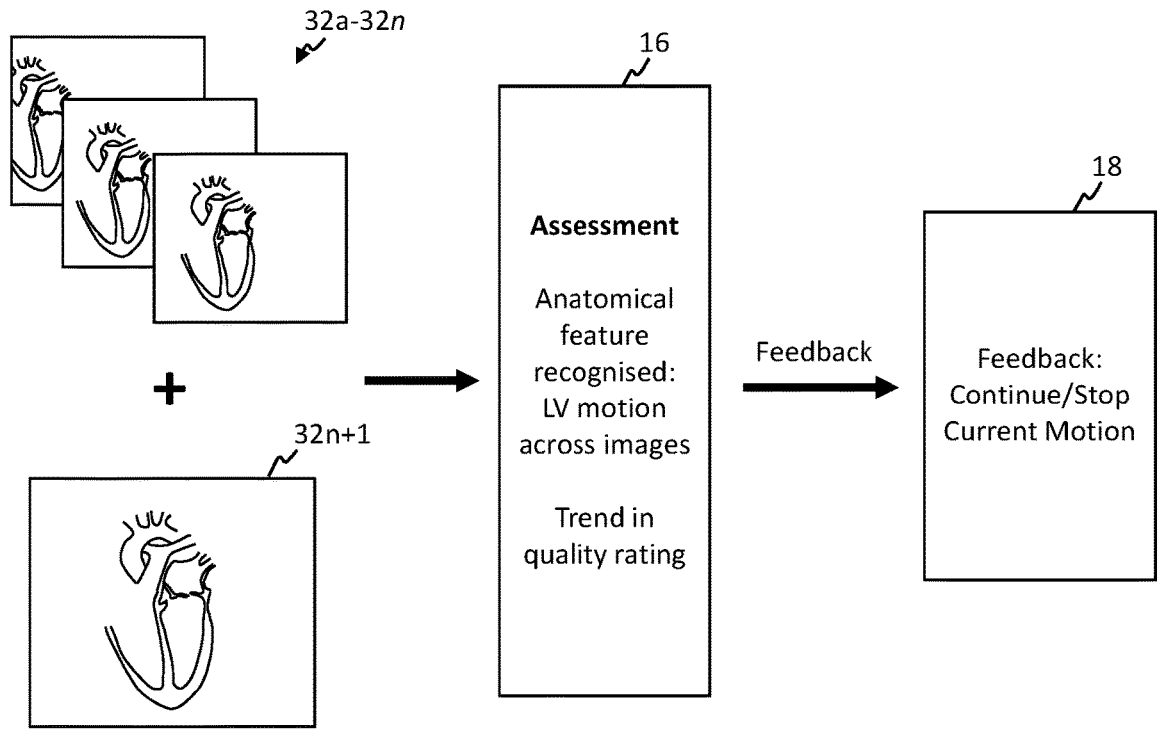
FIG. 4 schematically outlines the workflow of an example method in accordance with a further group of embodiments.

An example workflow in accordance with this set of embodiments is schematically outlined in FIG. 4.

In this example, the assessment procedure 16 is configured to receive as input the ultrasound data for the n (or n+1) most recent imaging views. For example, at each new position of the probe as the user moves the probe, the system provides the assessment procedure with the ultrasound data for the new (current) imaging view $32n+1$, in addition to the ultrasound data for the immediately temporally preceding n imaging views $32a$-$32n$.

The assessment procedure processes the ultrasound data for these series of recent imaging views and is configured to determine information indicative of a trend in the quality rating of the imaging views over time across the course of the series of n imaging views. For example, the assessment procedure 16 assesses whether the user-imparted probe movements are bringing the probe closer to an optimal position, based on the history of change in the quality of the images, or further from the optimum position.

The assessment procedure may be based on detection or assessment of one or more anatomical features within the data for each imaging view. For example, it may be based on presence or non-presence of one or more anatomical features of interest. It may be based on the extent to which one or more anatomical features are fully present in the imaging view. For instance, in the example illustrated in FIG. 4, the assessment procedure is based on detection of an extent to which the left ventricle (LV) is present and centrally positioned within the imaging view.

The assessment procedure is configured to recognize from the ultrasound data for the series of imaging views the changing position of the LV across imaging views to determine a trend or change over time in the quality ratings. For example, an AI module may be employed which is trained to recognize this change in the LV position.

The assessment procedure is configured to generate feedback guidance 18 based on the assessment of the series of images, the feedback guidance indicative of a suggested or proposed movement of the probe for improving the quality rating score of ultrasound data, i.e. for moving to a new location with a more optimum imaging view.

The feedback may for example take the form of a recommendation to either continue along the current motion path if the quality ratings are increasing, or to change movement course if the quality ratings are reducing.

The n most recent imaging views which are fed to the assessment procedure each time may correspond to a relatively short prior window of time, such that the guidance feedback relates to the most recent movement direction of the probe. For example, n may be less than 10, for example less than 5. This means that the feedback is able to react quickly to changes in the movement of the ultrasound probe by the user, and give recommendation feedback in relation to their most recent movement path.

The number n may be predefined and/or may be user adjustable in some examples.

The feedback may guide the user to a probe position that contains the LV in a better or more acceptable location (e.g. typically, around the center of the image).

The approach according to this second set of embodiments is also able to take into account temporal features in the quality results that would not be apparent in a single static image alone. For example, the assessment procedure, by taking as input ultrasound data for a series of imaging views, is able to take account of periodic variation in imaging features. For example, many anatomical features exhibit periodic motion (e.g. heart, lungs), and wherein suitability for deriving a clinical parameter is high during one phase of the period and low during another. Assessing a series of imaging views at once allows such periodic features to be taken into account, to avoid incorrectly designating a particular imaging view as low quality when in fact it is high quality, but periodically variable. The system in some cases may, as part of the feedback, be able to suggest workarounds for poor quality views resulting from cardiac motion.

For example, cardiac motion may result in the left ventricle (LV) partially exiting the ultrasound field of view (FOV) during end diastole (ED), even though it is fully contained in the FOV during end systole (ES). If temporal trends are not considered here, the image may be alternatingly classified as "bad" and "good", respectively, even though the general probe position may be satisfactory for the purpose extraction of clinical parameters or measurements relating to the left ventricle, for instance by a segmentation algorithm.

The assessment procedure in this example preferably employs one or more machine learning algorithms. For example, the assessment procedure in this example may employ use of a convolutional neural network (CNN).

For example, the assessment procedure may apply a CNN comprising the same elements as outlined above in respect of the example of FIG. 3 for the first set of embodiments. Alternatively, the assessment procedure may employ use of a fully convolutional neural network (CNN) that was trained on a task of segmenting the LV within ultrasound data for each of a plurality of ultrasound image series'. Methods are known in the art for performing such detection.

The CNN may be trained to identify an LV within each individual imaging view of the input series of imaging view, and determine quality rating for each input image view separately. From this a trend in the imaging view quality over time can be determined. Alternatively, the CNN may be trained to identify movement in the LV over the series of images based on consideration of the whole dataset as a whole, or to determine a trend in quality rating based on the data for the whole series of images. Thus in this case an individual quality rating is not determined for each imaging view, but quality ratings for the different views are merely implicitly taken into account.

In some examples, the shape and size of the LV mask applied to each imaging view may at least in part define a quality rating of the imaging view(s). Alternatively, feature embedding generated by a decoder component of the U-Net architecture could be further used to regress a quality score (e.g. multi-task learning (segmentation and classification)).

By way of example, during the training phase of the AI assessment procedure module (e.g. a CNN), the procedure may be trained using multiple images (current live image+ 'n' previous images), input to the module via multiple channels.

Each such training group of n+1 imaging views is labelled (ground truth labels) with a correct indication of a trend in the quality rating, or alternatively in a movement trend of a relevant anatomical feature, e.g. left ventricle (LV), across the series of imaging views.

The ground truth labels may for instance be indicative of the progression of the relevant image feature (LV, in this case) through the multiple images and for example how it relates to what action the user should be taking.

The ground truth labels for each respective series of imaging views are assigned by experts in advance.

The assessment module (e.g. the AI module or network) is intended in effect to emulate the analytical considerations or behavior of a person who is evaluating the ultrasound images during a probe manipulation. It is well known that humans incorporate temporal information into their decision making when evaluating US images. In this way, the feedback is more intuitively intelligible to an operator.

Various options are possible in accordance with this set of embodiments, both for the assessment procedure and the feedback to the user. These may be applied in addition to the features mentioned above, or as an alternative to any of the features mentioned above.

In accordance with one or more examples, the assessment procedure 16 may be fed as input the ultrasound data for the current (live) imaging view, along with the n previous imaging views, and may be configured to determine and output a quality rating for the current live imaging view. This may for instance be a discrete rating in the form good/medium/bad. These quality ratings for each new 'current' imaging view are cumulatively stored in a dataset to build up the history of imaging view quality ratings over time. This history of ratings may be presented (e.g. displayed) to the user as at least part of the feedback in some examples.

In accordance with one or more examples, the assessment procedure may be fed as an input the ultrasound data for the current imaging view and for the n previous imaging views. The procedure may be configured to determine and output a quality rating for the current live imaging view, as well as an indication of a trend in quality rating over the course of the n+1 imaging views (e.g. "improving", "consistent", or "deteriorating"). Both pieces of information may be presented to the user as part of the feedback. This may be presented in addition to a representation of the history 26 of quality ratings over time for example.

In accordance with one or more examples, the assessment procedure may be provided as an input the ultrasound data for the current imaging view and for the n previous imaging views. The assessment procedure may be configured to determine a quality rating for each one of the imaging views. These may be stored in an array or dataset. The assessment procedure may provide this set of quality ratings for the imaging views as an output. The assessment procedure or the feedback module may determine a trend in the quality ratings over time over the course of the imaging views based on the derived array of quality ratings for each individual imaging view. Information indicative of this trend may be displayed to the user as at least part of the feedback.

When each next image is acquired, the assessment procedure may again derive a quality rating for each imaging view of the updated set of n+1 imaging views. A temporal filter may be applied in some examples to ensure consistency in the quality rating determinations for the n overlapping frames in each temporally consecutive set of n+1 imaging views. This results in more stable feedback to the user over time.

In accordance with one or more examples, instead of the input to the assessment procedure 16 being the data for the n most recent imaging frames, it could be fed a different set, m, of previous images. For example, a longer temporal history can be taken into account without increasing the computational requirements, by inputting every other imaging view over the previous 2n imaging views, resulting in a total of m imaging views fed to the assessment procedure. Any other pattern or selection of imaging views may alternatively be used in further examples.

In accordance with one or more examples, the system may be configured to detect when an optimum or approximately optimum imaging view has been reached and to communicate this to the user as at least part of the feedback.

In particular, when the user is already close to an optimum imaging view, moving in any direction would result in a "deteriorating" trend. Such a response in the history data or the other feedback should indicate to the user that they should stop attempting to adjust the probe. However, this can also be flagged automatically by the system and communicated to the user by means of relevant feedback, e.g. a recommendation (such as "undo latest maneuver"/"go back to previous view").

Figure 5:
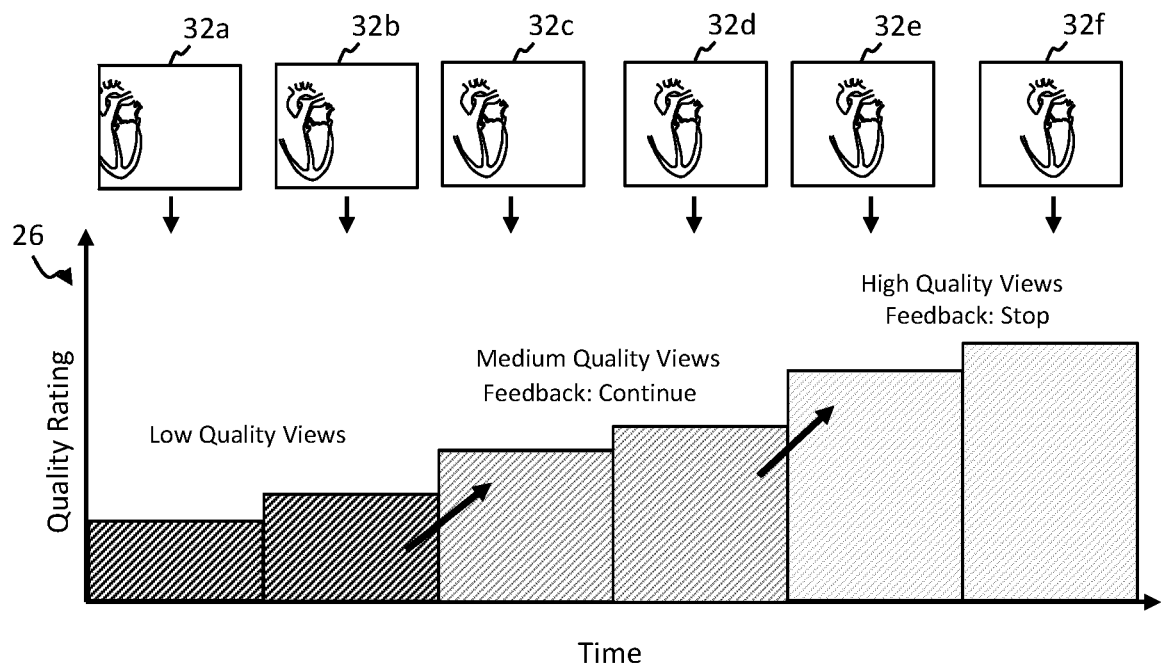
FIGS. 5 and 6 schematically illustrate a workflow during example implementations of a method in accordance with one or more embodiments.
Figure 6:
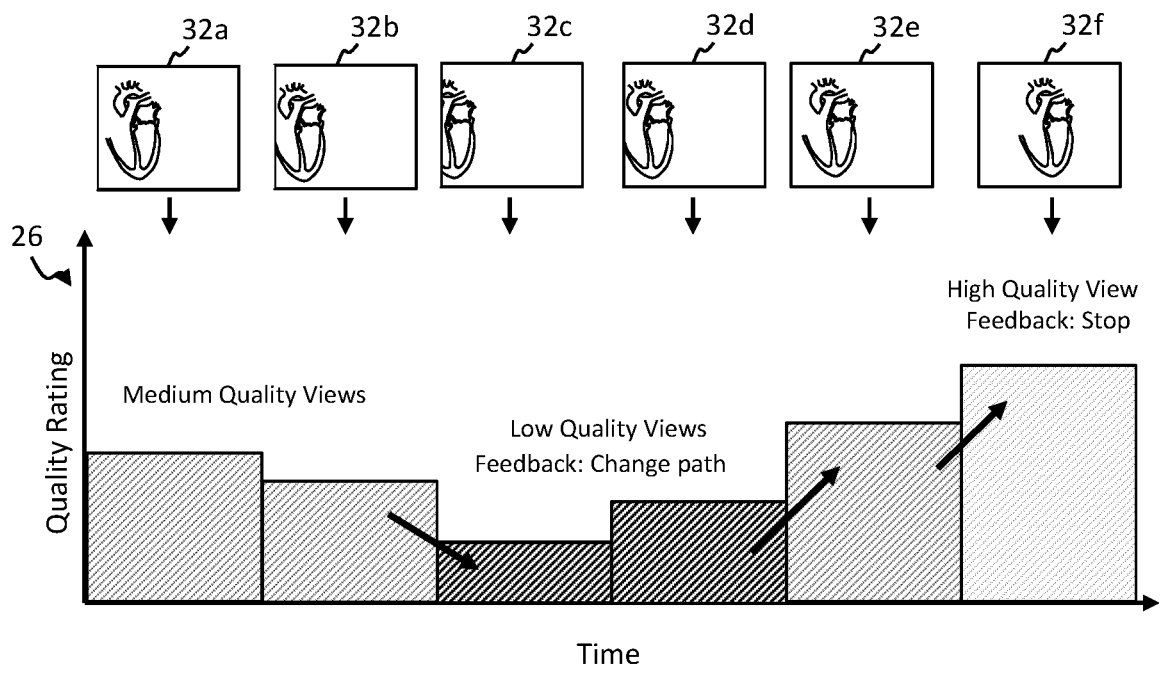

FIGS. 5 and 6 schematically illustrate example workflows during two example implementations of a method in accordance with the above described second set of embodiments. In the first example workflow (FIG. 5), the user starts in a sub-optimal position and slowly improves the quality of the imaging view. In the second example (FIG. 6), the user starts in a reasonable position, but inadvertently makes the imaging view quality worse, before correcting based on feedback.

In more detail, with reference to FIG. 5, the probe 22 begin in in a sub-optimal position (imaging view 32a). By way of example, the quality rating for each imaging view is generated based on an extent to which the anatomical feature of the left ventricle (LV) is present and clearly visible in the imaging view. FIG. 5 shows a graph illustrating the history 26 of quality ratings (y-axis) as a function of time (x-axis) for a series of imaging views 32a-32f A schematic representation of each of the imaging views 32 is shown aligned above its respective rating in the graph.

For the first imaging view 32a, the imaging view has a low quality rating.

The user begins to re-position the probe, while multiple images (the current live image and 'n' previous images) are continuously fed into the assessment procedure 16 (e.g. an AI module).

When the assessment procedure recognizes a pattern progression in the images (i.e. a trend either upward or downward in quality rating), it outputs feedback in the form of a recommendation to the user with respect to the probe maneuver they are currently performing.

In this example, the LV is detected to be moving more centrally into the image as the probe movement continues, resulting in quality ratings increasing. The recommendation is therefore to "continue" the current probe maneuver.

As the user continues the current probe maneuver, the view quality increases even further (i.e. LV continues to move towards the center of the FOV), so the same output is maintained by the AI module.

Eventually, the user arrives at a good LV-centric view (imaging view 320 at which point the assessment procedure suggests to the user to stop further probe manipulations as a good view has been achieved. For example, the assessment procedure determines that the rate of increase in imaging view quality as a function of time is slowing, which may be taken as an indication that an optimum view is being approached, or is close.

In another example, and with reference to FIG. 6, the probe starts at an imaging view 32a with a reasonably good ('medium') quality rating. In an attempt to improve the view, the user maneuvers the probe. However, in this example, the movement moves the probe to an imaging view of lower quality, resulting in an imaging view 32c with very low quality rating. The assessment procedure detects the downward trend in the quality rating and generates feedback in the form of a recommendation to change the movement course of the probe. The user then begins to change the probe maneuver. This results in slow improvement in the quality rating of the imaging views (e.g. the LV starts to come back into the FOV), with imaging view 32e being of a medium quality, and eventually imaging view 32f being of high quality. The assessment procedure again detects this upward trend in quality rating and generates feedback recommending the user stop movement once the quality rating is high or the imaging view is detected be close to an optimum position.

It is noted that both in the examples of FIG. 5 and FIG. 6, cardiac motion will be present, so the temporal LV progression or motion will not be as smooth as indicated in the figures. In particular, there will typically be two different motion frequencies exhibited in the motion: cardiac (cyclic) frequency and the actual probe motion frequency.

Figure 7:
FIG. 7 shows a set of example captured ultrasound imaging views and associated quality scores.

Furthermore, it is noted that although in the example of FIG. 5 and FIG. 6 the changing image view quality is illustrated in terms of a move of the anatomical feature (the LV in this case) toward or away from the center of the image view, more generally the image view quality may be related to other factors. In particular, the degree to which the anatomical body of interest is present and clearly visible, for example whether it is blurry or sharply delineated. This is illustrated schematically in FIG. 7 which illustrates a set of example image views each labelled with an example image quality rating for the imaging view. Image view (a) for example shows the left ventricle centrally positioned and sharply delineated. It has a high quality score rating of 0.99. Image view (b) shows the left ventricle less centrally located but still sharply delineated. It has a slightly lower quality score rating of 0.95. Image view (c) shows the left ventricle centrally located but blurry or faded. It has a relatively low quality score rating of 0.40. Image view (d) shows the key portion of the heart (the left ventricle) missing from the captured ultrasound image data. Here, the image view rating is the lowest of the four example image views, with a rating score of 0.30.

In accordance with any of the above-described embodiments, depending upon the quality rating of the imaging views that the user is currently generating, it may be optimal to move at different speeds. For example, when the user is currently at a position corresponding to a low quality rating imaging view, and is moving the probe in an attempt to improve the quality, relatively fast movement may be acceptable. By contrast, when a user has reached a relatively high quality imaging view and may be about to achieve an optimum imaging view, slower movement may be preferable to avoid overshooting the optimum location.

To address this, in accordance with one or more examples, the system may be configured to output maneuvering advice as part of the feedback to the user. This may for example be in addition to information about the current quality rating of the current imaging view and/or of the history of imaging view ratings over time, and/or of a trend in imaging view ratings. For example, the maneuvering advice may be to move fast when quality is low, to slow down when quality is medium, and to maintain constant speed or slow down at a faster rate when quality is high. The system might employ a simple look-up-table to achieve this: bad quality→move fast, medium quality→slow down, good quality→steady motion.

Additionally or alternatively, a motion detection algorithm may be provided running in the background. Ultrasound-based motion detection algorithms are known in the art and include for instance speckle tracking algorithms, which enable motion speed to be detected based on speed at which a speckle pattern in ultrasound imaging data is detected to be moving. This algorithm may evaluate the magnitude of motion and warn the user if the maneuvering pace exceeds certain pre-defined thresholds or ranges for the current imaging view quality, these corresponding to a pre-determined optimum speed for different imaging view qualities.

In accordance with one or more advantageous embodiments, the method in accordance with any of the above embodiments may be implemented as part of a personalized learning tool. For example, for a specific user, the system stores their pattern of probe movements during an imaging procedure, and then afterwards may provide specific recommendations based on how he or she has manipulated the probe (e.g. whether they most efficiently adjusted the probe position, whether they achieved an optimum imaging view). The user can then review these patterns offline, and potentially learn their "preferred" maneuvers, and optimize them to reach desired views in the most efficient manner possible.

Although in the particular examples described above, it has been proposed to employ machine learning algorithms for implementing the assessment procedure, in further embodiments the assessment procedure may employ non machine learning approaches.

By way of example, model-based segmentation (MBS) algorithms may be employed in accordance with one or more examples. For example, a segmentation algorithm may be employed for identifying or detecting a particular anatomical feature of interest within each imaging view. A quality rating for each imaging view may be based on the outcome of the segmentation algorithm, for instance based on presence or absence of the anatomical feature of interest, or based on a degree to which the feature is fully included within the imaging view.

In some examples, the quality rating may be indicative of, or related to, an extent to which an image view contains a particular anatomical feature. For example if only half of an anatomical feature of interest is detected as present in the image by a segmentation (or other) algorithm, the quality rating may be 50%, while if none of the feature is present the quality rating might be 0%. For example the rating may be related to the proportion of an anatomical feature or region of interest that is included in an image view.

Examples in accordance with a further aspect of the invention provide a computer program product comprising code means configured, when run on a processor, to cause the processor to perform a method in accordance with any of the embodiments or examples outlined above or described herein, or in accordance with any claim of the present application.

The processor in use may be communicatively coupled with an ultrasound probe. Alternatively the processor may be arranged to receive the ultrasound data from a different source, for instance from an ultrasound imaging system, from a central server, or from a memory store in some examples.

Examples in accordance with a further aspect of the invention also provide a system for guiding a user of an ultrasound imaging system during ultrasound imaging of a subject's body, the ultrasound imaging system comprising an ultrasound probe having a moveable location relative to the subject's body.

Figure 8:
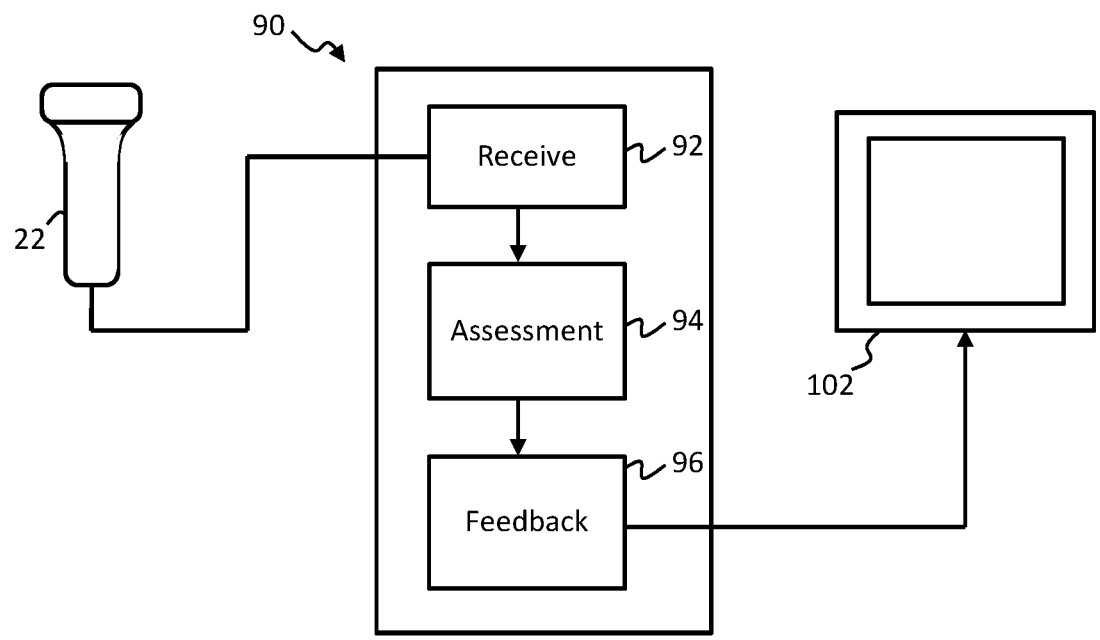
FIG. 8 schematically illustrates in block diagram form an example guidance system in accordance with one or more embodiments.

An example system 90 is schematically illustrated in FIG. 8.

The system is shown in use, communicatively coupled with an ultrasound imaging probe 22 for receiving ultrasound image data. In other examples, the system may be communicatively or operatively coupled with an ultrasound imaging system, e.g. a diagnostic ultrasound system. Examples in accordance with a further aspect provide an ultrasound imaging system which includes an ultrasound probe 22 and includes the guidance system 90.

Returning to the guidance system 90 of FIG. 8, the system comprises a receiving module 92 adapted to receive during an ultrasound imaging procedure ultrasound data representative of a plurality of ultrasound imaging views, each view corresponding to data captured from a respective location of the probe, and at a respective time point during the procedure.

The system 90 further includes an assessment module 94 configured to apply an assessment procedure to the ultrasound data, the procedure operable to assess a quality of the ultrasound imaging views, the quality related to the suitability of the ultrasound data for the different imaging views for observing one or more anatomical features or deriving one or more clinical parameters from the data.

The system further includes a feedback module 96 configured to generate, based on the assessment procedure, guidance feedback for assisting a user in positioning the probe, the guidance feedback being based on a history of image view ratings over time during the imaging procedure.

By way of illustration, the feedback module 96 in the example of FIG. 8 is shown operatively coupled to a display unit 102 for outputting to the display visual guidance feedback for the user. This represents just one example. In other examples, the feedback unit may generate a different form of sensory feedback, e.g. auditory feedback, or even haptic feedback in some examples, e.g. vibrations of a strength or frequency or vibration pattern configured to represent the history of image view quality ratings over time.

Implementation options and details for each of the features of the above system may be understood and interpreted in accordance with the explanations and descriptions provided above in respect of the method aspect of the present invention.

Any of the examples, options or embodiment features or details described above in respect of the guidance method may be applied or combined or incorporated into the present system aspect of the invention.

Although in the example system 90 discussed above, the receive module 92, assessment module 94 and feedback module 96 are shown and described as being separate components, this is not essential. Their relevant functionalities may be distributed in different ways among one or more components. In some examples for instance, the functionality of the different modules may be integrated and performed by a single element, for example by a single controller or processor, or their functionalities may be otherwise distributed between one or more elements or components. Alternatively, the functionality of each module may be performed by a separate controller or processor within the system 90.

Embodiments of the present invention may find particularly advantageous application for transesophageal echocardiography (TEE), for example for the purpose of TEE monitoring over an extended and/or continuous period. For example, the ultrasound probe may be a transesophageal echocardiography (TEE) probe.

However, TEE represents just one example application area, and embodiments of the invention may be advantageously applied for any other type of ultrasound examination. Embodiments may be particularly advantageous for long term or continuous or on-going ultrasound examinations, i.e. ultrasound monitoring applications, where position of an ultrasound probe can drift over time, and may need to be recurrently corrected. The guidance system in accordance with embodiments of the present invention enables even a non-expert operator to adjust the position of the probe accurately and quickly.

As discussed above, embodiments may make use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items (e.g. several modules) recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method of guiding a user of an ultrasound system during an imaging procedure of a subject's body, wherein the ultrasound system comprises an ultrasound probe having a moveable location relative to the subject, the method comprising:
   controlling, during the imaging procedure, the ultrasound probe to obtain ultrasound data representative of a plurality of imaging views while the user moves the ultrasound probe from a first location of the subject's body to a second location of the subject's body, wherein the plurality of imaging views comprises a first imaging view of an anatomy corresponding to the first location and a second imaging view of the anatomy corresponding to the second location;
   determining a recommended movement for the ultrasound probe based solely on the plurality of imaging views and without physically tracking the ultrasound probe, wherein the recommended movement comprises:
      changing the ultrasound probe to be in a third location of the body; or
      maintaining the ultrasound probe at the second location,
   wherein determining the recommended movement comprises:
      generating a plurality of ratings for the plurality of imaging views,
      wherein the plurality of ratings comprises a first rating for the first imaging view and a second rating for the second imaging view, wherein the first rating and the second rating comprise quantitative representations of a visual appearance of the anatomy in the first imaging view and the second imaging view, respectively;
      determining a change between the first rating and the second rating; and
   outputting, to a display, guidance to the user based on the recommended movement, wherein the guidance is configured to provide feedback for assisting the user in real-time during the imaging procedure to physically control the ultrasound probe to change the ultrasound probe to the third location or maintain the ultrasound probe at the second location.

2. The method as claimed in claim 1, wherein the first rating and the second rating are indicative of suitability of the ultrasound data for at least one of:
   observing one or more anatomical features of the anatomy, wherein the one or more anatomical features comprise a left ventricle; or
   deriving one or more clinical parameters from the ultrasound data, wherein the one or more clinical parameters comprise at least one of left ventricular volume, stroke volume, or cardiac output.

3. The method as claimed in claim 2, wherein the one or more clinical parameters are derived when the plurality of ratings indicates a likelihood of success.

4. The method of claim 3,
   wherein the first location and the second location define a first direction that the user moves the ultrasound probe,
   wherein the feedback is to continue moving the ultrasound probe in the first direction to the third location when the change is positive,
   wherein the feedback is to move the ultrasound probe in a different, second direction to the third location when the change is negative.

5. The method as claimed in claim 1,
   wherein determining the recommended movement comprises determining a trend in plurality of ratings over time, and
   wherein the guidance is based on said trend.

6. The method as claimed in claim 1, wherein determining the recommended movement comprises building up, based on the assessment procedure, a dataset representative of a history of the plurality of ratings over time during the imaging procedure.

7. The method as claimed in claim 1,
wherein the guidance comprises a history of the plurality of ratings as a function of time,
wherein the history of ratings comprises the first rating and the second rating.

8. The method as claimed in claim 1, wherein determining the recommended movement is performed in turn for the ultrasound data of each respective imaging view and a respective rating generated for each imaging view in turn.

9. The method as claimed in claim 1, wherein determining the recommended movement is performed for the ultrasound data for the plurality of imaging views at once.

10. The method as claimed in claim 9, wherein at least one of:
the plurality of imaging views are temporally consecutive; or
the plurality of imaging views are temporally ordered and include every $m^{th}$ imaging view of a previous N imaging views.

11. The method as claimed in claim 1,
wherein determining the recommended movement utilizes a machine learning algorithm, and
wherein the machine learning algorithm comprises a convolutional neural network (CNN).

12. The method as claimed in claim 1,
wherein determining the recommended movement comprises detecting one or more anatomical features in the ultrasound data for the plurality of imaging views, and
wherein the plurality of ratings is based on said detection.

13. The method as claimed in claim 1, wherein the feedback is to maintain the ultrasound probe at the second location when a rate of increase in the plurality of ratings is slowing.

14. A guidance system for guiding a user of an ultrasound system during an imaging procedure of a subject's body,
wherein the ultrasound system comprises an ultrasound probe having a moveable location relative to the subject,
wherein the guidance system is operatively coupleable with the ultrasound system in use,
wherein the guidance system comprises a processor configured to:
control, during the imaging procedure, the ultrasound probe to obtain ultrasound data representative of a plurality of imaging views while the user moves the ultrasound probe from a first location of the subject's body to a second location of the subject's body, wherein the plurality of imaging views comprises a first imaging view of an anatomy corresponding to the first location and a second imaging view of the anatomy corresponding to the second location;
determine a recommended movement for the ultrasound probe based solely on the plurality of imaging views and without physically tracking the ultrasound probe,
wherein the recommended movement comprises:
changing the ultrasound probe to be in a third location of the body;
or
maintaining the ultrasound probe at the second location, wherein determination of the recommended movement comprises:
generation of a plurality of ratings for the plurality of imaging views, wherein the plurality of ratings comprises a first rating for the first imaging view and a second rating for the second imaging view, wherein the first rating and the second rating comprise quantitative representations of a visual appearance of the anatomy in the first imaging view and the second imaging view, respectively;
determination of a change between the first rating and the second rating; and
output, to a display, guidance to the user based on the recommended movement, wherein the guidance is configured to provide feedback for assisting the user in real-time during the imaging procedure to physically control the ultrasound probe to change the ultrasound probe to the third location of the body or maintain the ultrasound probe at the second location.

15. The guidance system as claimed in claim 14,
further comprising the ultrasound probe,
wherein the ultrasound probe is a transesophageal echocardiography (TEE) probe.

* * * * *